(12) United States Patent
Aoki

(10) Patent No.: US 7,177,280 B2
(45) Date of Patent: Feb. 13, 2007

(54) DATA TRANSFER PROCESSING APPARATUS, DATA TRANSFER METHOD, AND DATA TRANSFER PROGRAM

(75) Inventor: Tetsuya Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 1069 days.

(21) Appl. No.: 10/155,495

(22) Filed: May 23, 2002

(65) Prior Publication Data

US 2002/0176425 A1 Nov. 28, 2002

(30) Foreign Application Priority Data

May 25, 2001 (JP) ............................ P2001-157173

(51) Int. Cl.
*H04J 3/14* (2006.01)
*H04L 12/56* (2006.01)
(52) U.S. Cl. .................... 370/235; 370/395.4; 370/418
(58) Field of Classification Search ................. 370/417
See application file for complete search history.

(56) References Cited

U.S. PATENT DOCUMENTS

| 6,295,516 B1* | 9/2001 | Takeyasu | 703/13 |
| 6,442,208 B1* | 8/2002 | Horiguchi et al. | 375/257 |
| 6,604,154 B1* | 8/2003 | Takegami et al. | 710/52 |
| 7,016,303 B1* | 3/2006 | Sakamoto et al. | 370/235 |
| 7,050,446 B2* | 5/2006 | Hata | 370/412 |
| 2002/0009049 A1* | 1/2002 | Nomura | 370/229 |
| 2002/0105905 A1* | 8/2002 | Boyle et al. | 370/229 |

* cited by examiner

*Primary Examiner*—Hassan Kizou
*Assistant Examiner*—Brian Roberts
(74) *Attorney, Agent, or Firm*—Frommer Lawrence & Haug LLP; William S. Frommer; Thomas F. Presson

(57) ABSTRACT

This invention is intended to realize with ease flow control and quantization error reduction in a data transfer operation executed via the IEEE 1394 serial bus. A FIFO once holds data supplied from a decoder and outputs the data in a predetermined send timing relation. At this moment, a counter counts the number of packets to sent from the FIFO to an IEEE 1394 bus. In order to increasing data transfer quantity in accordance with a send command issued by a register, a data packet is sent at transfer of an empty packet. In order to decrease data transfer quantity, an empty packet is sent in a timed relation in which a data packet is sent. A data quantity monitor requests the decoder for supplying data or stopping thereof via a data input controller so as to prevent the FIFO from overflowing or being emptied in accordance with flow control.

7 Claims, 5 Drawing Sheets

DATA TRANSFER PROCESSING APPARATUS, DATA TRANSFER METHOD, AND DATA TRANSFER PROGRAM

BACKGROUND OF THE INVENTION

The present invention relates to a data transfer processing apparatus, a data transfer method, and a data transfer program for realizing flow control when transferring data by use of the IEEE 1394 serial bus.

IEEE (Institute of Electrical and Electronics Engineers) 1394 serial bus is known which is suitable as an interface for use in portable and desktop computer environment and consumer electronics such as audio and video equipment. The communication based on the IEEE 1394 standard has been attracting much attention because of its capabilities such as isochronous data transmission, asynchronous data transmission, high-speed data transmission (100 to 3200 Mbps), and connection of plural devices (or nodes).

Conventionally, when realizing flow control in the IEEE 1394 serial bus, the quantity of send data is controlled by executing variable pitch on the application clock of the sending device. Therefore, those devices which are not compatible with the variable pitch capability cannot perform flow control. In addition, in the conventional data transfer based on the IEEE 1394 serial bus, clock information is sent along with data, so that noise superimposition or quantization error occurs during communication. Therefore, especially the transfer of music data presents a problem of the deterioration of tone quality due to data transfer.

SUMMARY OF THE INVENTION

It is therefore an object of the present invention to provide a data transfer apparatus, a data transfer method, and data transfer program which are capable of easily realizing flow control, preventing noises from superimposing on data, and ignoring quantization error in data transfer via a serial bus.

In carrying out the invention and according to one aspect thereof, there is provided a data transfer processing apparatus for transmitting data supplied from a preceding circuit over a serial bus on a packet basis, including: holding means for holding a data transfer variable; buffer means for temporarily holding data supplied from the preceding circuit and outputting the temporarily held data in a predetermined transmission timed relation; count means for counting the number of packets to be transmitted over the serial bus from the buffer means during a predetermined transfer period; and transmission control means for, on the basis of the data transfer variable held in the holding means and a count value of the count means, increasing or decreasing the number of data packets to be transmitted over the serial bus from the buffer means.

In the above-mentioned data transfer processing apparatus, the transmission control means, when increasing a data transfer quantity, may transmit a data packet at transfer of an empty packet included in a packet group to be transmitted during the predetermined transfer period and, when decreasing a data transfer quantity, may transmit an empty packet in a timed relation in which a data packet is transmitted.

The above-mentioned data transfer processing apparatus may further include monitor means for monitoring a data quantity held in the buffer means, and data supply quantity indicating means for, on the basis of a data quantity in the buffer means monitored by the monitor means and a data transfer variable held in the holding means, indicating to the preceding circuit a data supply quantity to be supplied to an apparatus concerned.

In the above-mentioned data transfer processing apparatus, the serial bus may be an IEEE 1394 serial bus.

In carrying out the invention and according to another aspect thereof, there is provided a data transfer method for transmitting data supplied from a preceding circuit over a serial bus on a packet basis, including the steps of: when holding temporarily data supplied from the preceding circuit and transmitting the temporarily held data over the serial bus in a predetermined transmission timed relation, counting the number of packets to be transmitted over the serial bus during a predetermined transfer period; and on the basis of a data transfer variable and the count value, increasing or decreasing the number of data packets to be transmitted over the serial bus.

In the above-mentioned data transfer method, when increasing a data transfer quantity, a data packet may be transmitted at transfer of an empty packet included in a packet group to be transmitted during the predetermined transfer period and, when decreasing a data transfer quantity, an empty packet may be transmitted in a timed relation in which a data packet is transmitted.

In the above-mentioned data transfer method, a quantity of the temporarily held data is monitored, and, on the basis of the monitored data quantity and the data transfer variable, a data supply quantity to be supplied to an apparatus concerned is indicated to the preceding circuit.

In carrying out the invention and according to still another aspect thereof, there is provided, a data transfer program for causing a computer to execute the steps of: holding temporarily data supplied from the preceding circuit and transmitting the temporarily held data over the serial bus on a packet basis in a predetermined transmission timed relation; counting the number of packets to be transmitted over the serial bus during a predetermined transfer period; and on the basis of a data transfer variable and the count value, increasing or decreasing the number of data packets to be transmitted over the serial bus.

In the above-mentioned data transfer program, the step of increasing or decreasing the number of data packets further including the steps of: when increasing a data transfer quantity, transmitting a data packet at transfer of an empty packet included in a packet group to be transmitted during the predetermined transfer period; and when decreasing a data transfer quantity, transmitting an empty packet in a timed relation in which a data packet is transmitted.

The above-mentioned data transfer program, further including the steps of monitoring the quantity of the held data and on the basis of the monitored data quantity and the data transfer variable, indicating to the preceding circuit a data supply quantity to be supplied to an apparatus concerned.

In the present invention, a data transfer variable is held in the holding means. Data supplied from the preceding circuit are temporarily held in the buffer means. When outputting the held data in a predetermined timed relation, the number of packets to be transmitted from the buffer means over the serial bus is counted by the count means. On the basis of the data transfer variable held in the holding means and the a count value obtained by the count means, the number of data packets to be transmitted over the serial bus is increased or decreased by the transmission control means. Consequently, in a data transfer operation via a serial bus for example, the present invention facilitates the realization of flow control, prevents noises from superimposing on data, and allows to ignore quantization error.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings.

A. Configuration of Embodiment

Figure 1:
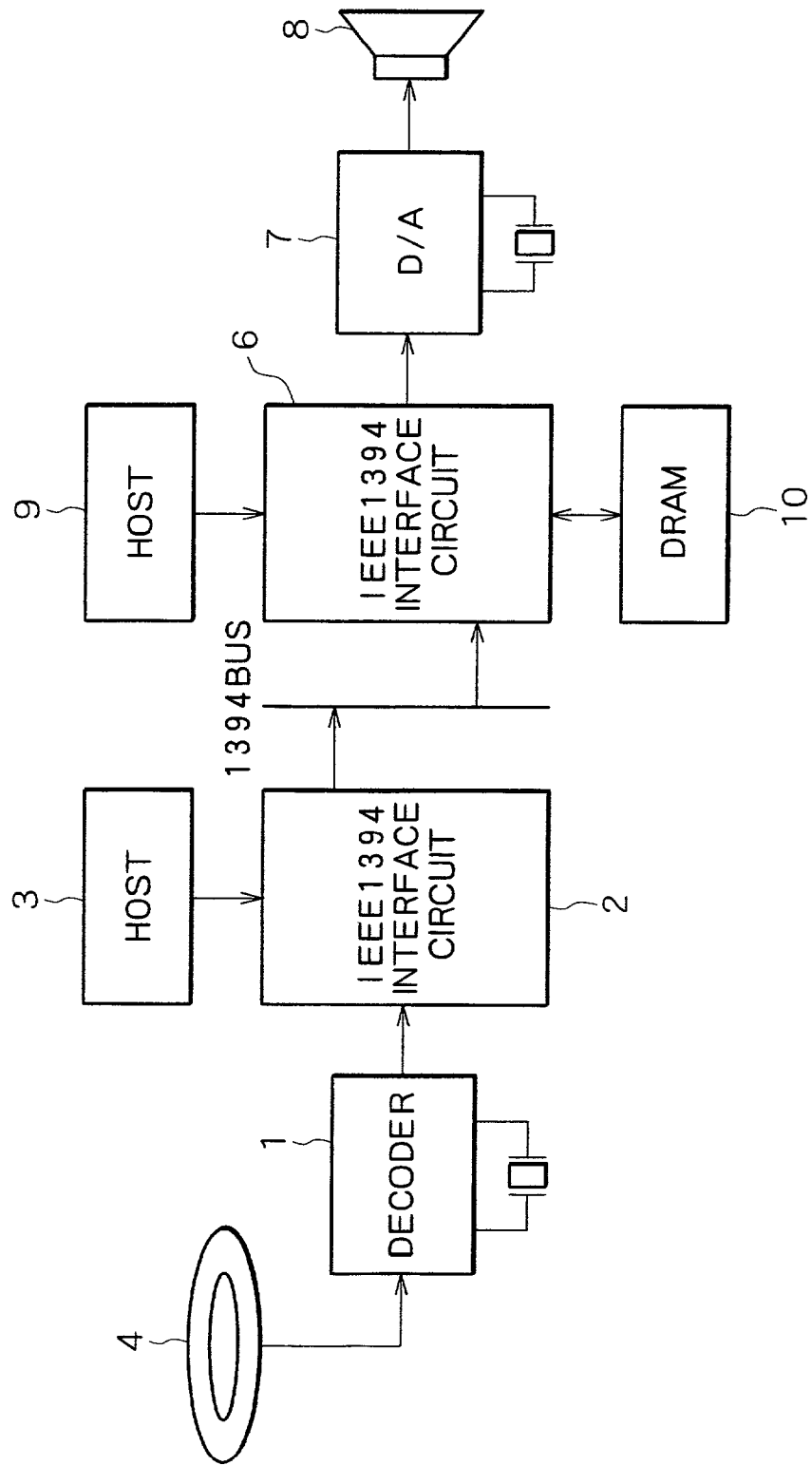
FIG. 1 is a block diagram illustrating a configuration of a data transmission/reception system practiced as one embodiment of the invention.

Now, referring to FIG. 1, there is shown a block diagram illustrating a configuration of a data transmission/reception system practiced as one embodiment of the invention. A transmission-side apparatus of this system includes a decoder 1, an IEEE 1394 interface circuit 2, and a host (a microcomputer) 3. The decoder 1 reads data from a medium 4 such as a super audio CD (SACD) and decodes the data. The IEEE 1394 interface circuit 2 sends the decoded data to a reception-side apparatus via an IEEE 1394 serial bus as an isochronous packet based on the IEEE 1394 standard. The host 3 instructs the IEEE 1394 interface circuit 2 for transmission of the data.

The reception-side apparatus includes an IEEE 1394 interface circuit 6, a D/A converter 7, a speaker 8, a host (a microcomputer) 9, and a DRAM 10. The IEEE 1394 interface circuit 6 receives the isochronous packet transferred from the transmission-side apparatus via the IEEE 1394 serial bus and supplies the received packet to the D/A converter 7. The D/A converter 7 converts the data packet into an analog signal. The speaker 8 sounds out the analog signal received from the D/A converter 7. The host 9 controls the operation of the IEEE 1394 interface circuit 6.

Figure 2:
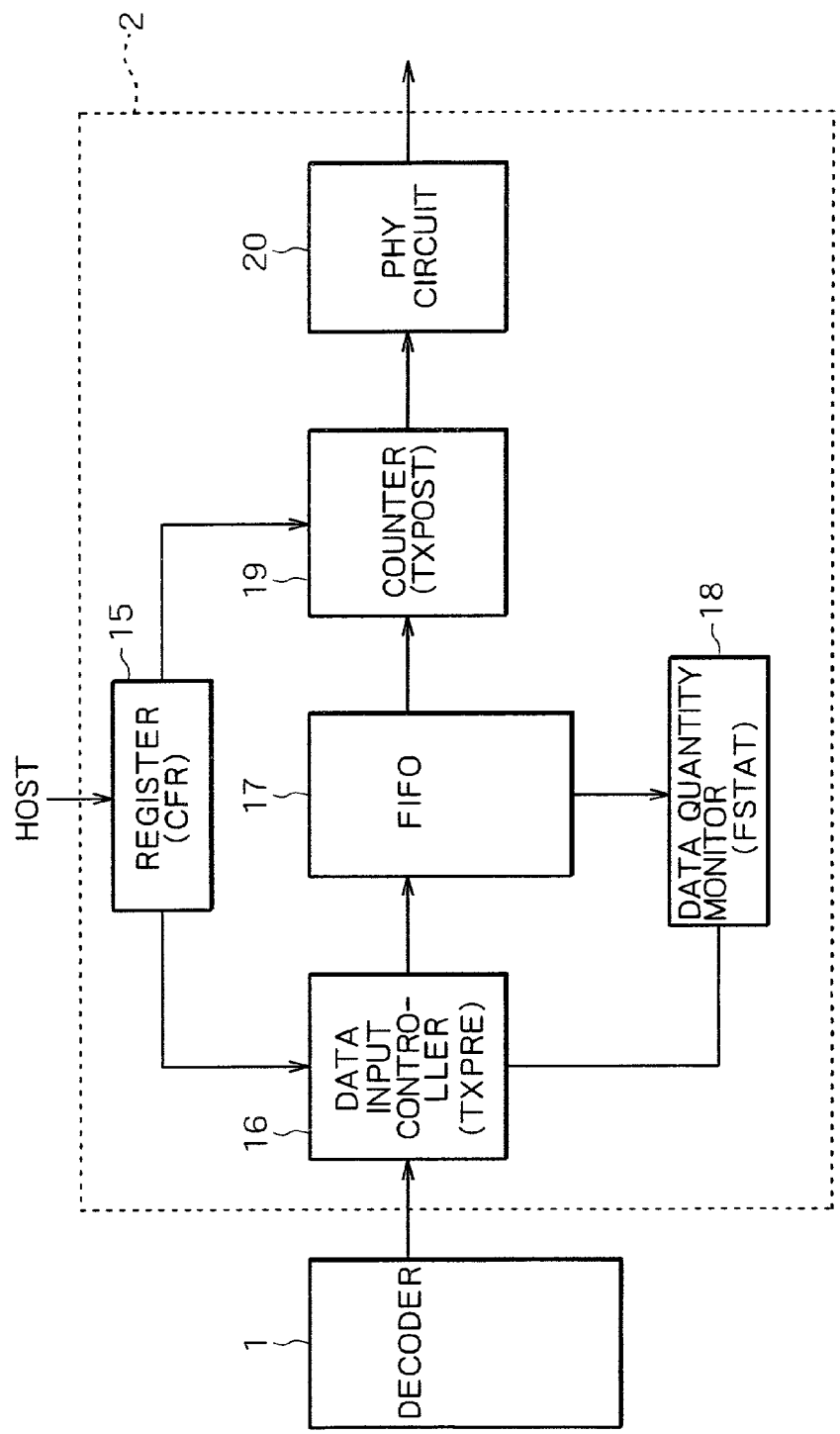
FIG. 2 is a block diagram illustrating a configuration of an IEEE 1394 interface circuit of the transmission-side apparatus in the data transfer system shown in FIG. 1.

Referring to FIG. 2, there is shown a block diagram illustrating a configuration of the IEEE 1394 interface circuit of the transmission-side apparatus in the data transmission/reception system. The IEEE 1394 interface circuit 2 includes a register (CFR: Configuration Register) 15, data input controller (TXPRE: Tx pre-process) 16, a FIFO 17, a data quantity monitor (FSTAT: Fifo STATus check) 18, a counter (TXPOST: Tx post process) 19, and a PHY (Physical layer) circuit 20. The register 15 stores a transmission command (±1%). The data input controller 16 instructs the decoder 1 to send data to be supplied from the decoder 1 to a circuit concerned in a quantity in accordance with the transmission command and under the control of the data quantity monitor 18 and supplies the data supplied from the decoder 1 to the FIFO 17. At this moment, the data are converted into a quadlet for IEEE 1394 transmission.

The FIFO 17 stores data supplied from the data input controller 16 on a bank basis and sequentially sends the stored data to the counter 19. The data quantity monitor 18 monitors the data quantity in the FIFO 17 (for overflow or emptiness) and causes the data input controller 16 to request the decoder 1 for data or stop the request so as to prevent the FIFO 17 from overflowing or becoming empty. In accordance with the transmission command stored in the register 15, the counter 19 counts the number of times an isochronous packet is transmitted from the FIFO 17 (free-run counting). Also, when increasing data transfer quantity, the counter 19 sends a data packet at the transfer of an empty packet included in a packet group to be sent in the above-mentioned predetermined transfer period; when decreasing data transfer quantity, the counter 19 sends an empty packet in a timed relation in which a data packet is sent. Each empty packet is a packet consisting of only a 1394 header and CIP1/2 which is transferred when there is no data to be transmitted. At the time of transmission, the counter 19 adds a header and a CRC to each IEEE 1394 quadlet for transmission. The PHY circuit 20 converts each isochronous packet supplied from the FIFO 17 into an electrical signal which runs over the actual IEEE 1394 bus and performs bus arbitration.

Figure 3:
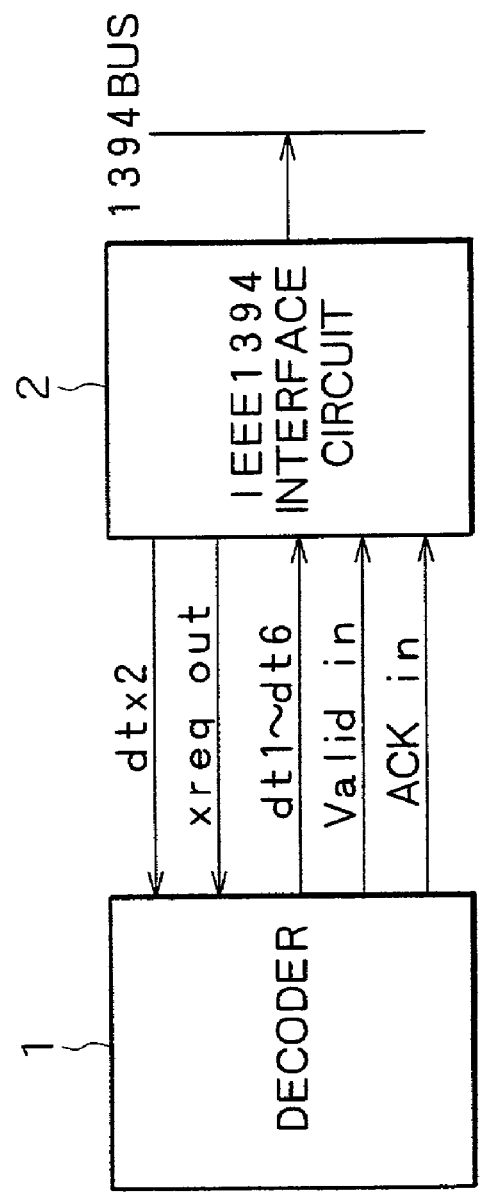
FIG. 3 is a block diagram illustrating a connection relationship between a decoder and the IEEE 1394 interface circuit shown in FIG. 2.

Referring to FIG. 3, there is shown a block diagram illustrating a connection relationship between the decoder and the IEEE 1394 interface circuit. The decoder 1 and the IEEE 1394 interface circuit 2 are interconnected as shown in FIG. 3. By sending a data request or a data stop command from the IEEE 1394 interface circuit 2 to the decoder 1, the IEEE 1394 interface circuit 2 controls the data transfer period in the decoder 1, thereby controlling the quantity of data to be inputted from the decoder 1 to the IEEE 1394 interface circuit 2. A dtx2 is a double-speed request signal for the decoder side and an xreq_out is a data stop request signal for the decoder side.

At the time of +1% transmission, the shortage of data in the FIFO 17 is expected, so that the IEEE 1394 interface circuit 2 sets the dtx2 to "H" to request the decoder 1 for double-speed transfer. When a FULL signal (indicative of immediately before an overflow) of the FIFO 17 is recognized by the data quantity monitor 18, the IEEE 1394 interface circuit 2 stops the data request for the decoder 1. Namely, dtx2 =L/XREQ=H. On the other hand, when the FULL signal is deactivated, the IEEE 1394 interface circuit 2 sets the dtx2 to "H" again to request the decoder 1 for double-speed transfer. This is intended to prevent the data in the FIFO 17 from being emptied to disable +1% transfer.

At the time of −1% transmission, the transfer speed over the IEEE 1394 bus becomes slow, so that a normal write operation is basically performed, the data quantity in the FIFO 17 increases in the direction of FULL. In this case, the IEEE 1394 interface circuit 2 sets XREQ to "H" in accordance with a FULL signal indicative that the data quantity in the FIFO 17 has reached just before an overflow, thereby stopping the transfer from the decoder 1.

B. Operation of embodiment

The following describes the operation of the above-mentioned embodiment. Now, referring to FIG. 4, there is shown a timing chart illustrating the control signals and data transferred between the decoder and the IEEE 1394 interface circuit shown in FIG. 3. FIG. 5 shows a schematic diagram illustrating the transmission control to be performed in the transmission-side apparatus.

A ±1% transmission command is written from the host 3 to the register 15. The data input controller 16 supplies the data from the decoder 1 to FIFO 17. The FIFO 17 holds the data on a bank basis and outputs the stored data in a predetermined timed relation. The counter 19 counts the number of times an isochronous packet is transmitted from the FIFO 17 on the basis of the transmission command stored in the register 15 (free-run counting).

At this moment, while monitoring the FIFO 17 for data overflow or emptiness through the data quantity monitor 18, a data request to the decoder 1 or the stop thereof is performed through the data input controller 16 immediately before the FIFO 17 overflows or is emptied.

Figure 4:
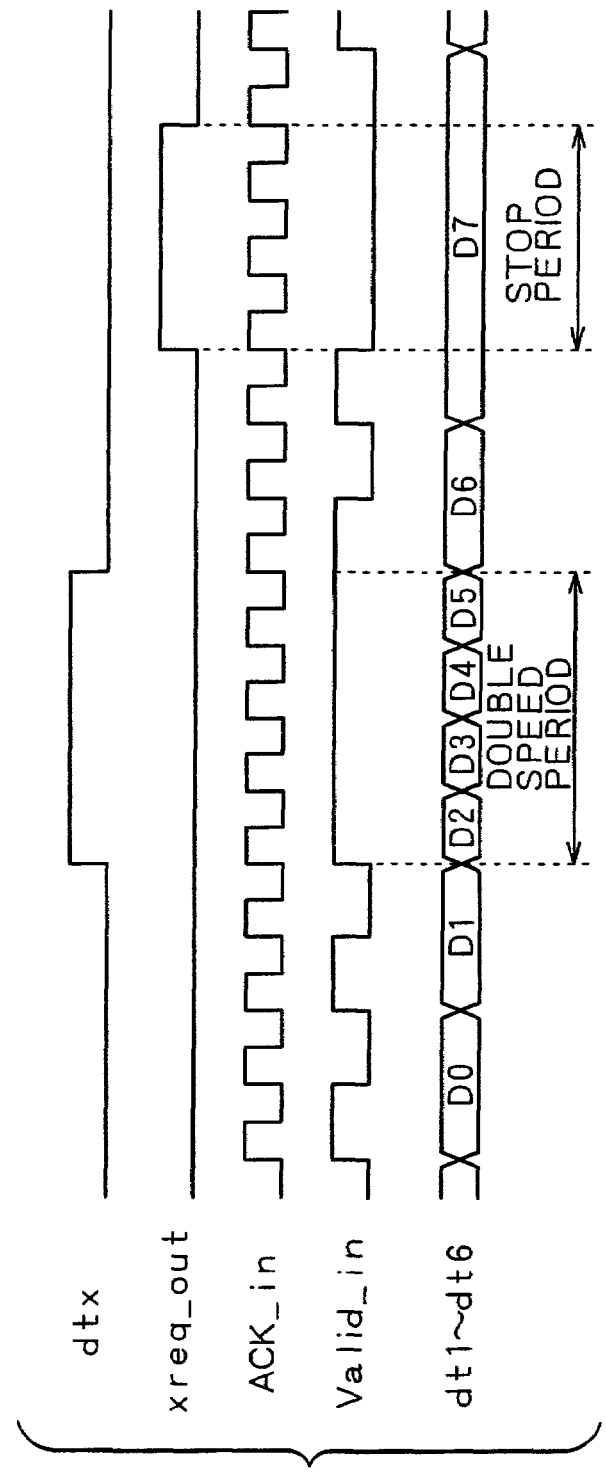
FIG. 4 is a timing chart illustrating the transfer of control signals and data between the decoder shown in FIG. 3 and the above-mentioned IEEE 1394 interface circuit.
Figure 5:
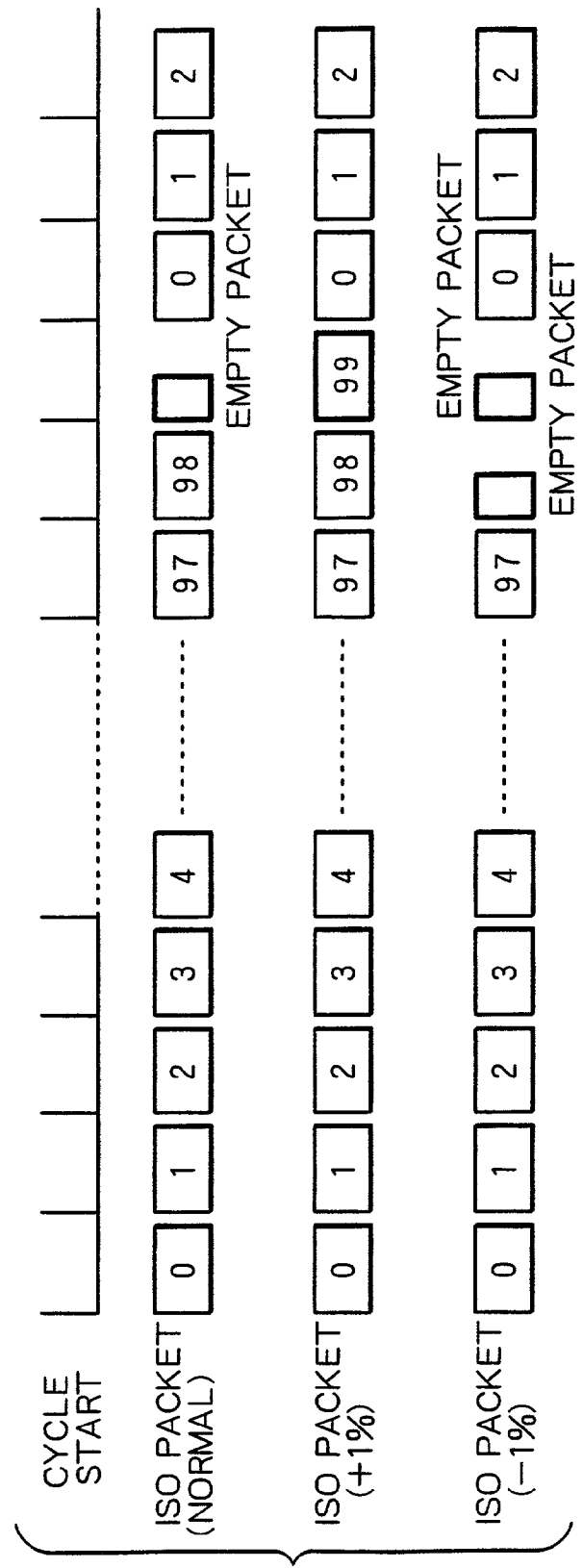
FIG. 5 is a schematic diagram illustrating transmission control on the transmission-side apparatus.

To be more specific, as shown in the timing chart of FIG. 4, at the time of +1% transmission, the dtx2=H, requesting the decoder 1 for double-speed transfer (a double-speed period). Then, when a FULL (before overflow) signal of the FIFO 17 is recognized by the data quantity monitor 18, the dtx2=L/xreq_out=H, thereby stopping the data request to the decoder 1 (a stop period). On the other hand, if the FULL signal is deactivated, a double-speed transfer request is made to the decoder 1 again (not shown).

At the time of −1% transmission, the transfer speed on the bus becomes slow, so that a normal write operation is performed. When the data quantity in the FIFO 17 increases to a point immediately before an overflow, the xreq_out=H, thereby stopping the data transfer from the decoder 1.

On the transmission-side apparatus, as shown in FIG. 5, the IEEE 1394 interface circuit 2 controls the timing of data transmission over the IEEE 1394 bus in accordance with a count value of the counter 19. For example, if isochronous cycle is 100, normally data are transmitted 99 times, an empty packet being transmitted once. On the basis of this transmission, ±1% transmission/reception is controlled. Namely, at the time of +1% transmission, a data packet is transmitted in a timed relation in which an empty packet is normally transmitted, in accordance with a transmission count provided by the counter 19. At the time of −1% transmission, contrary to the +1% transmission, an empty packet is transmitted in a timed relation in which a data packet is transmitted, in accordance with a transmission count provided by the counter 19. Namely, an empty packet is transmitted even if there remain data in the FIFO 17.

For example, in the case of a super audio CD (SACD), transfer is made 91.87 times in 100 isochronous cycles. Therefore, isochronous packet transfer may be made 92.7887 times at the time of +1% transmission and 90.9513 times at the time of −1% transmission. In the IEEE 1394 interface circuit 2 according to the present embodiment, if a +1% transmission command is issued by the host 3, isochronous packet transmission is made 93 times in 100 isochronous cycles (to be exact, +1.012%). At the time of a −1% transmission command, isochronous packet transmission is made 90 times (to be exact, −2%). In other words, at the time of −1% transmission, an empty packet is transmitted in a portion beyond 90 times.

According to the above-mentioned embodiment, in the data transfer via the IEEE 1394 serial bus, clock synchronization is enabled between the transmission-side apparatus and the reception-side apparatus. Hence, the reception-side apparatus can read data from the master clock, thereby preventing noises from superimposing on music data and allowing to ignore the quantization error due to the IEEE 1394 serial bus.

As described and according to the invention, a data transfer processing apparatus for transmitting data supplied from a preceding circuit over a serial bus on a packet basis, includes: holding means for holding a data transfer variable; buffer means for temporarily holding data supplied from the preceding circuit and outputting the temporarily held data in a predetermined transmission timed relation; count means for counting the number of packets to be transmitted over the serial bus from the buffer means during a predetermined transfer period; and transmission control means for, on the basis of the data transfer variable held in the holding means and a count value of the count means, increasing or decreasing the number of data packets to be transmitted over the serial bus from the buffer means. Consequently, in a data transfer operation via a serial bus for example, the present invention facilitates the realization of flow control, prevents noises from superimposing on data, and allows to ignore quantization error.

In the above-mentioned data transfer processing apparatus according to the present invention, the transmission control means, when increasing a data transfer quantity, can transmit a data packet at transfer of an empty packet included in a packet group to be transmitted during the predetermined transfer period and, when decreasing a data transfer quantity, can transmit an empty packet in a timed relation in which a data packet is transmitted. Consequently, in a data transfer operation via a serial bus for example, the present invention facilitates the realization of flow control, prevents noises from superimposing on data, and allows to ignore quantization error.

The above-mentioned data transfer processing apparatus according to the present invention further includes monitor means for monitoring a data quantity held in the buffer means; and data supply quantity indicating means for, on the basis of a data quantity in the buffer means monitored by the monitor means and a data transfer variable held in the holding means, indicating to the preceding circuit a data supply quantity to be supplied to an apparatus concerned. Consequently, in a data transfer operation via a serial bus for example, the present invention facilitates the realization of flow control, prevents noises from superimposing on data, and allows to ignore quantization error.

In the above-mentioned data transfer processing apparatus according to the present invention, the serial bus is an IEEE 1394 serial bus. Consequently, in a data transfer operation via a serial bus for example, the present invention facilitates the realization of flow control, prevents noises from superimposing on data, and allows to ignore quantization error.

According to the present invention, the data transfer method for transmitting data supplied from a preceding circuit over a serial bus on a packet basis, includes the steps of: when holding temporarily data supplied from the preceding circuit and transmitting the temporarily held data over the serial bus in a predetermined transmission timed relation, counting the number of packets to be transmitted over the serial bus during a predetermined transfer period; and on the basis of a data transfer variable and the count value, increasing or decreasing the number of data packets to be transmitted over the serial bus. Consequently, in a data transfer operation via a serial bus for example, the present invention facilitates the realization of flow control, prevents noises from superimposing on data, and allows to ignore quantization error.

In the above-mentioned data transfer method according to the present invention, when increasing a data transfer quantity, a data packet is transmitted at transfer of an empty packet included in a packet group to be transmitted during the predetermined transfer period and, when decreasing a data transfer quantity, an empty packet is transmitted in a timed relation in which a data packet is transmitted. Consequently, in a data transfer operation via a serial bus for example, the present invention facilitates the realization of flow control, prevents noises from superimposing on data, and allows to ignore quantization error.

In the above-mentioned data transfer method according to the present invention, a quantity of the temporarily held data is monitored, and, on the basis of the monitored data quantity and the data transfer variable, a data supply quantity to be supplied to an apparatus concerned is indicated to the preceding circuit. Consequently, in a data transfer operation via a serial bus for example, the present invention facilitates the realization of flow control, prevents noises from superimposing on data, and allows to ignore quantization error.

According to the present invention, the data transfer program for causing a computer to execute the steps of: holding temporarily data supplied from the preceding circuit and transmitting the temporarily held data over the serial bus on a packet basis in a predetermined transmission timed relation; counting the number of packets to be transmitted over the serial bus during a predetermined transfer period; and on the basis of a data transfer variable and the count value, increasing or decreasing the number of data packets to be transmitted over the serial bus. Consequently, in a data transfer operation via a serial bus for example, the present invention facilitates the realization of flow control, prevents noises from superimposing on data, and allows to ignore quantization error.

In the above-mentioned data transfer program according to the present invention, the step of increasing or decreasing the number of data packets further including the steps of: when increasing a data transfer quantity, transmitting a data packet at transfer of an empty packet included in a packet group to be transmitted during the predetermined transfer period; and when decreasing a data transfer quantity, transmitting an empty packet in a timed relation in which a data packet is transmitted. Consequently, in a data transfer operation via a serial bus for example, the present invention facilitates the realization of flow control, prevents noises from superimposing on data, and allows to ignore quantization error.

The above-mentioned data transfer program according to the present invention further includes the steps of: monitoring the quantity of the held data; and on the basis of the monitored data quantity and the data transfer variable, indicating to the preceding circuit a data supply quantity to be supplied to an apparatus concerned. Consequently, in a data transfer operation via a serial bus for example, the present invention facilitates the realization of flow control, prevents noises from superimposing on data, and allows to ignore quantization error.

While the preferred embodiments of the present invention have been described using specific terms, such description is for illustrative purposes only, and it is to be understood that changes and variations may be made without departing from the spirit or scope of the appended claims.

What is claimed is:

1. A data transfer processing apparatus for transmitting data supplied from a preceding circuit over a serial bus on a packet basis, comprising:

holding means for holding a data transfer variable;

buffer means for temporarily holding data supplied from said preceding circuit and outputting the temporarily held data in a predetermined transmission timed relation;

count means for counting a number of data packets to be transmitted over said serial bus from said buffer means during a predetermined transfer period;

transmission control means for, on the basis of said data transfer variable held in said holding means and a count value of said count means, increasing or decreasing the number of data packets to be transmitted over said serial bus from said buffer means;

monitor means for monitoring a data quantity held in said buffer means; and data supply quantity indicating means for indicating to said preceding circuit a data supply quantity to be supplied to a receiving apparatus on the basis of said data quantity in said buffer means monitored by said monitor means and said data transfer variable held in said holding means.

2. The data transfer processing apparatus according to claim 1, wherein said transmission control means, when increasing a data transfer quantity, transmits a data packet at transfer of an empty packet included in a packet group to be transmitted during said predetermined transfer period and, when decreasing a data transfer quantity, transmits an empty packet in a timed relation in which a data packet is transmitted.

3. The data transfer processing apparatus according to claim 1, wherein said serial bus is an IEEE 1394 serial bus.

4. A data transfer method for transmitting data supplied from a preceding circuit over a serial bus on a packet basis, comprising the steps of:

temporarily holding data supplied from said preceding circuit and transmitting the temporarily held data over said serial bus in a predetermined transmission timed relation;

counting a number of data packets to be transmitted over said serial bus during a predetermined transfer period;

increasing or decreasing the number of data packets to be transmitted over said serial bus on the basis of a data transfer variable and a count value from said counting step;

monitoring a quantity of said temporarily held data; and indicating to said preceding circuit a data supply quantity to be supplied to a receiving apparatus on the basis of the monitored data quantity and said data transfer variable.

5. The data transfer method according to claim 4, wherein, when increasing a data transfer quantity, a data packet is transmitted at transfer of an empty packet included in a packet group to be transmitted during said predetermined transfer period and, when decreasing a data transfer quantity, an empty packet is transmitted in a timed relation in which a data packet is transmitted.

6. A data transfer program stored on a computer readable medium, for transmitting data supplied from a preceding circuit over a serial bus on a packet basis, said program comprising the steps of:

temporarily holding data supplied from said preceding circuit and transmitting the temporarily held data over said serial bus on a packet basis in a predetermined transmission timed relation;

counting a number of data packets to be transmitted over said serial bus during a predetermined transfer period;

increasing or decreasing the number of data packets to be transmitted over said serial bus on the basis of a data transfer variable and a count value from said counting step;

monitoring a quantity of said temporarily held data; and indicating to said preceding circuit a data supply quantity to be supplied to a receiving apparatus on the basis of the monitored data quantity and said data transfer variable.

7. The data transfer program according to claim 6, wherein the step of increasing or decreasing the number of data packets further comprising the steps of:

increasing a data transfer quantity by transmitting a data packet at transfer of an empty packet included in a packet group to be transmitted during said predetermined transfer period; and decreasing a data transfer quantity by transmitting an empty packet in a timed relation in which a data packet is transmitted.

* * * * *